B. T. Nichols,
Harness Saddle.
№ 78,119.        Patented May 19 1868.
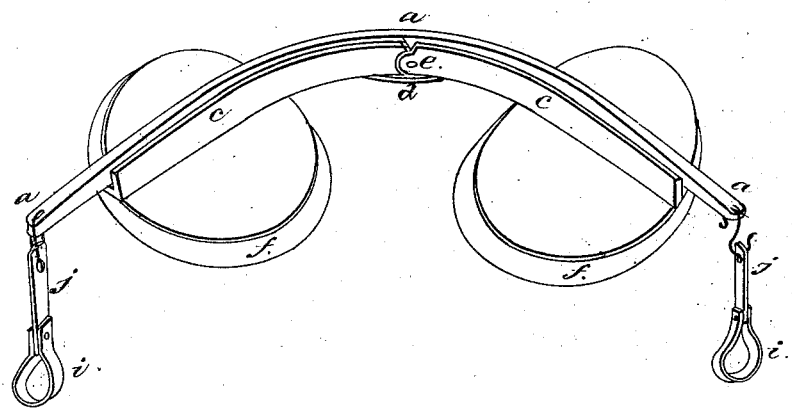
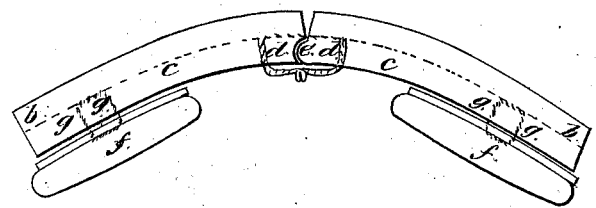
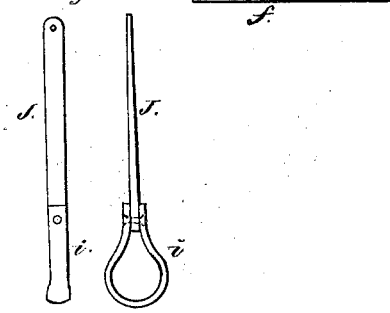
Inventor:
Baruk T Nichols

United States Patent Office.

BARAK T. NICHOLS, OF NEWARK, NEW JERSEY.

Letters Patent No. 78,119, dated May 19, 1868.

IMPROVEMENT IN THE MANUFACTURE OF CART-SADDLES.

The Schedule referred to in these Letters Patent and making part of the same.

TO ALL WHOM IT MAY CONCERN:

Be it known that I, BARAK T. NICHOLS, of the city of Newark, in the county of Essex, and State of New Jersey, have made certain Improvements in the Manufacturing Cart-Saddles; and do declare the following to be a full and exact description of the same, reference being herein had to the drawings that accompany this specification as part of the same.

The nature of my improvements consists in the construction of a cart-saddle in such a manner, and of such material, as to produce a good saddle, perfectly easy to the horse, and at much less cost than those made in the ordinary manner.

In the drawings—

Figure 1 are the various parts combined.

Figure 2 shows the bridge-pieces and pads.

Figure 3 indicates the thugs for the cart-thills.

The bridge $a$ is formed of wood, bent to the needed curve, so as to play freely in the groove, $b$, in the bridge-pieces $c\ c$, and to bring the main pressure on the top of the bridge-pieces.

The bridge-pieces $c\ c$ are connected, at their inner ends, by the thongs $d$, that pass through holes in the bridge-pieces $c$. These thongs can be of raw hide, or of any tough material. The ends of the bridge-pieces fit together with something like a hinge or rule-joint, without any centre-pin, which leaves them to work with ease, accommodating themselves to the back of the horse, ($e$, figs. 1 and 2.)

The pads $f$ are formed upon board backs, upon which the bridge-pieces $c\ c$ rest, and to which I connect them by means of the thongs $g$, that pass through suitable holes in bridge-piece and back of pad.

The under side of the bridge-piece that rests on the back of the pad is rounded, as shown on the end view $h$ of the bridge-piece $c$, in order that the motion in the saddle, which is inevitable, may not be of the pad upon the animal's skin, but in other parts of the saddle itself, thus constituting an anti-chafing saddle that has been much desired.

The thugs or tugs $i$, figs. 3 and 1, are of wood, bent, and pivoted or riveted to the strap $j$, which is of wood, metal, or raw hide; (for cheapness and strength, the raw hide would be preferred;) and the strap $j$ is fastened to the ends of the bridge $a$ by a hook, $k$, or by thongs, as at $l$, the thongs being of raw hide, or any other tough, flexible material.

What I claim as my improvement, and desire to secure by Letters Patent, is—

The bridge $a$, bridge-pieces $c\ c$, pads $f$, tugs $i$, and tug-straps $j$, all combined, constructed, arranged, and connected, substantially in the manner and for the purposes specified.

BARAK T. NICHOLS.

Witnesses:
    W. M. GOODING,
    EDWARD COLLYER.